Nov. 23, 1965   C. VAN DER LELY   3,218,787
COMBINATIONS OF AGRICULTURAL IMPLEMENTS WITH TRACTORS
Filed Jan. 25, 1961

INVENTOR.
CORNELIS VAN DER LELY
BY
Mason, Mason & Albright
ATTORNEYS

Nov. 23, 1965 C. VAN DER LELY 3,218,787
COMBINATIONS OF AGRICULTURAL IMPLEMENTS WITH TRACTORS
Filed Jan. 25, 1961 6 Sheets-Sheet 2
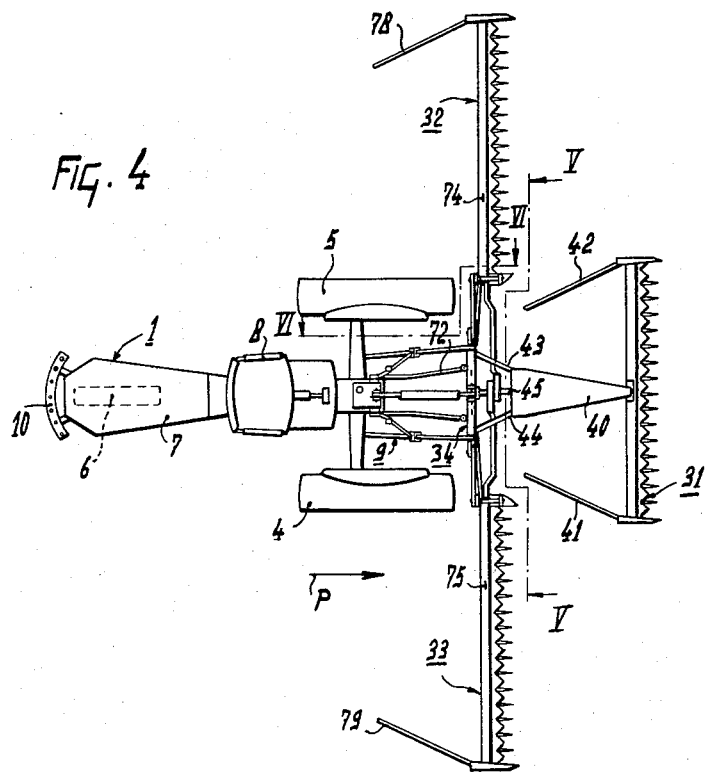
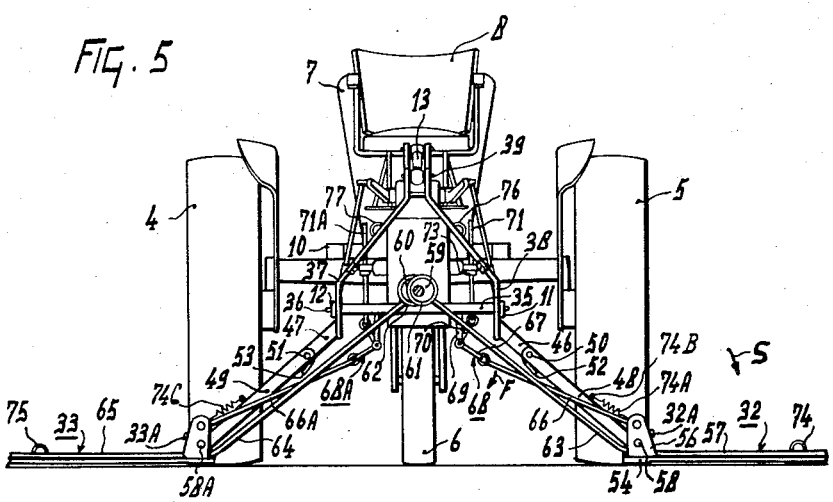
INVENTOR.
CORNELIS VAN DER LELY
BY
Mason, Mason & Albright
ATTORNEYS

INVENTOR.
CORNELIS VAN DER LELY

Nov. 23, 1965     C. VAN DER LELY     3,218,787
COMBINATIONS OF AGRICULTURAL IMPLEMENTS WITH TRACTORS
Filed Jan. 25, 1961     6 Sheets-Sheet 4

INVENTOR.
CORNELIS VAN DER LELY
BY
Mason, Mason & Albright
ATTORNEYS

Nov. 23, 1965  C. VAN DER LELY  3,218,787
COMBINATIONS OF AGRICULTURAL IMPLEMENTS WITH TRACTORS
Filed Jan. 25, 1961  6 Sheets-Sheet 5

INVENTOR.
CORNELIS VAN DER LELY
BY
Mason, Mason & Albright
Attorneys

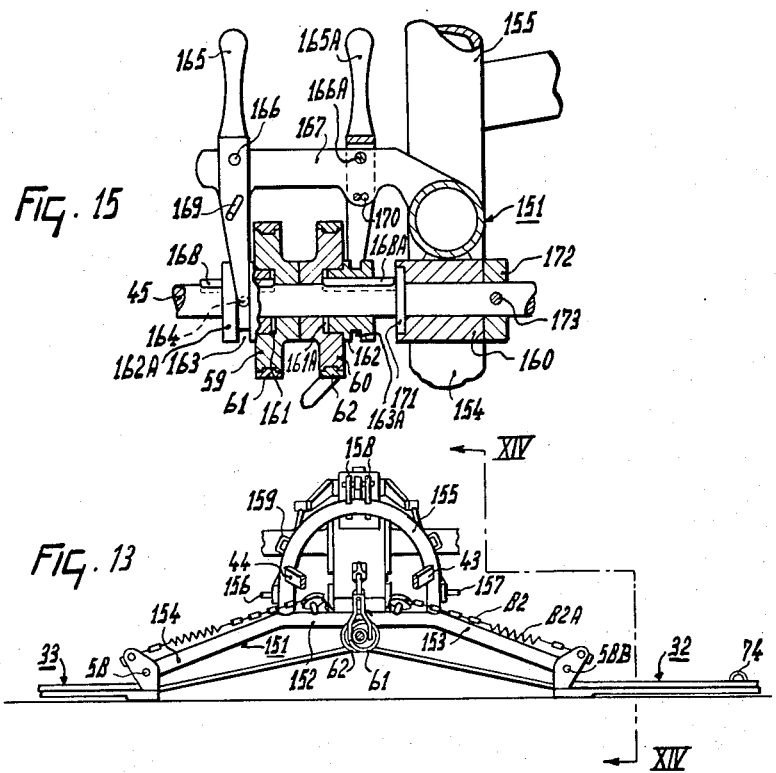
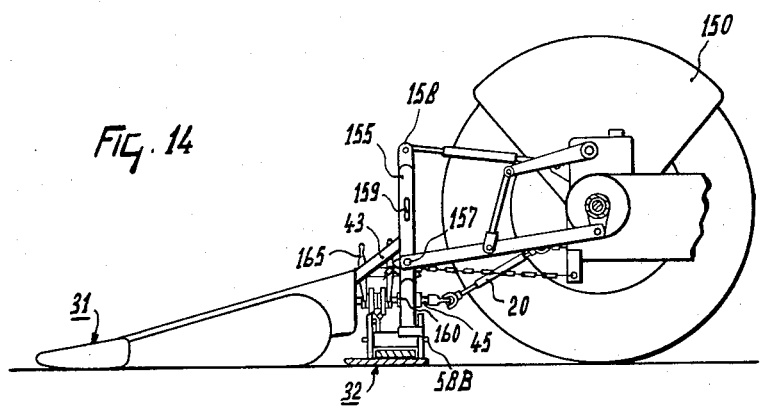

United States Patent Office 3,218,787
Patented Nov. 23, 1965

3,218,787
COMBINATIONS OF AGRICULTURAL
IMPLEMENTS WITH TRACTORS
Cornelis van der Lely, Zug, Switzerland, assignor to C. van
der Lely N.V., Maasland, Netherlands, a Dutch limited-
liability company
Filed Jan. 25, 1961, Ser. No. 84,934
Claims priority, application Netherlands, Feb. 8, 1960,
248,180
6 Claims. (Cl. 56—6)

This invention relates to combinations of one or more agricultural implements with a tractor.

According to the present invention there is provided a combination of a mowing implement and a raking implement for laterally displacing crop lying on the ground with a tractor, wherein the moving implement is connected to one end of the tractor and the raking implement to the other end.

Figure 1:
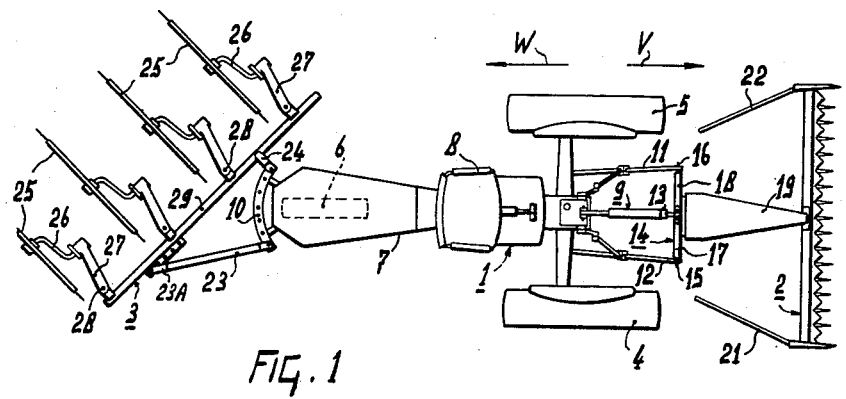
Figure 2:
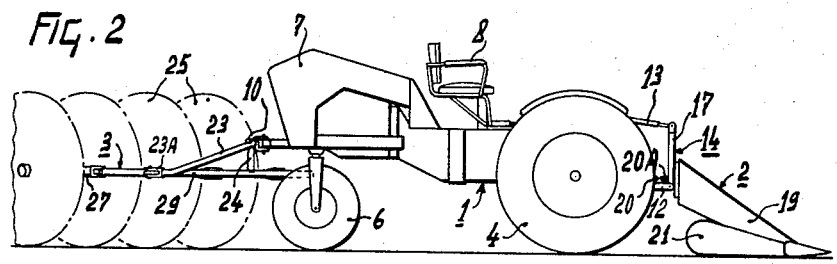
Figure 3:
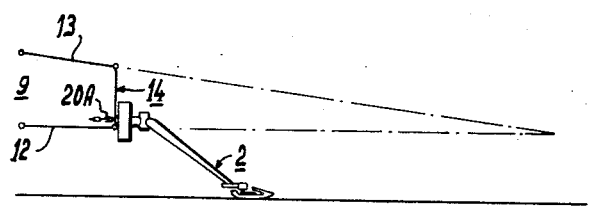
Figure 9:
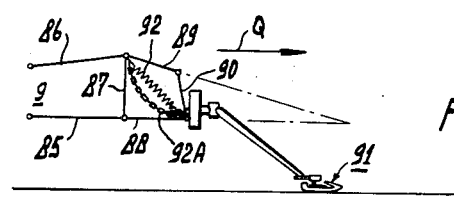
Figure 6:
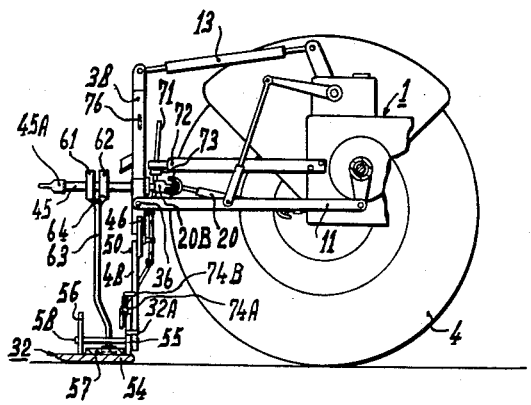
Figure 7:
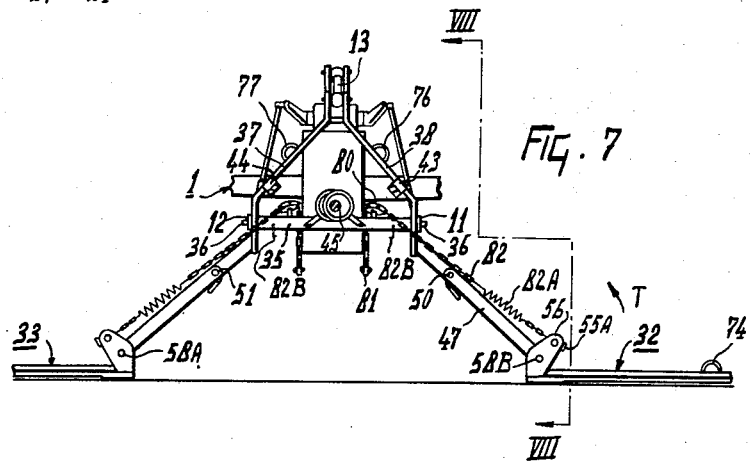
Figure 8:
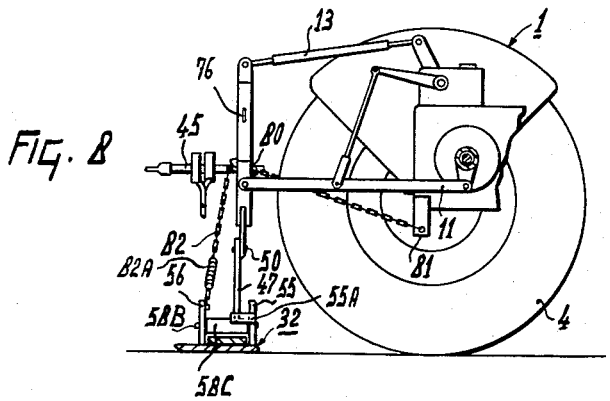
Figure 10:
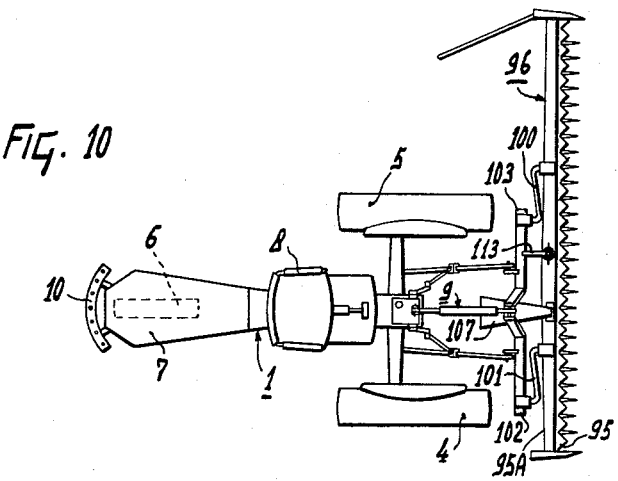
Figure 11:
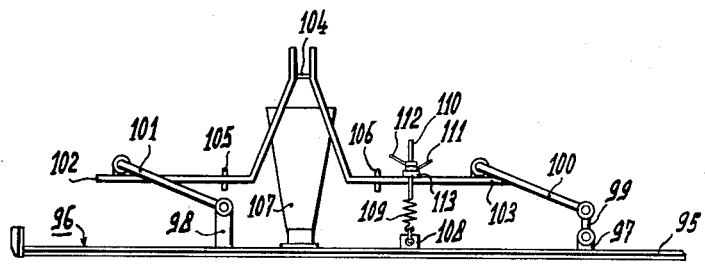
Figure 12:
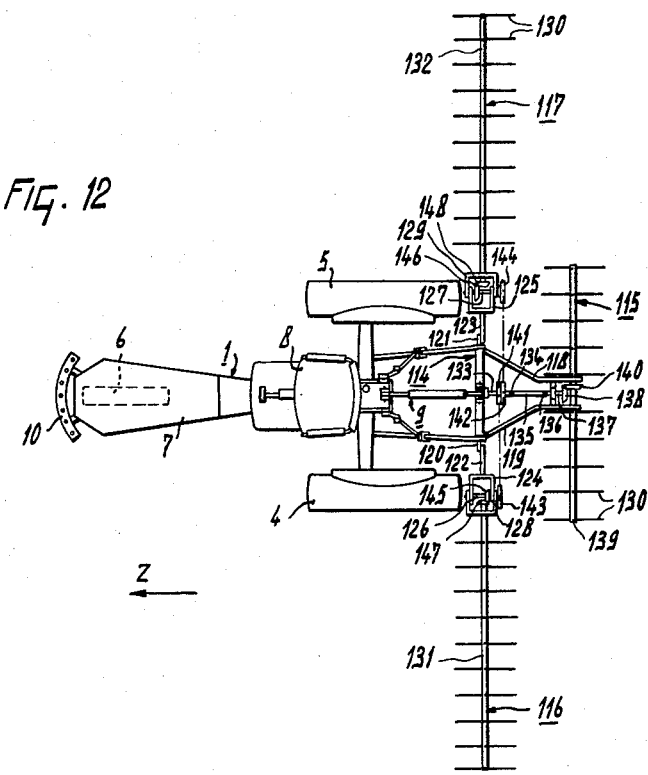

For a better understanding of the invention and to show how the same may be carried into effect, reference will now be made, by way of example, to the accompanying drawings, in which:

FIGURE 1 is a plan view of a tractor having a raking implement coupled to one end thereof and a mowing implement coupled to the other end thereof, FIGURE 2 is a side elevation corresponding to FIGURE 1, FIGURE 3 shows diagrammatically the coupling of a mowing implement to a lifting device, FIGURE 4 is a plan view of a tractor having three mowing implements coupled thereto, FIGURE 5 is a section, to an enlarged scale, taken on line V—V of FIGURE 4, FIGURE 6 is a section, to an enlarged scale, taken on the line VI—VI of FIGURE 4, FIGURE 7 is an elevational view showing a modification of the arrangement illustrated in FIGURE 5, FIGURE 8 is a section taken on the line VIII—VIII of FIGURE 7, FIGURE 9 shows diagrammatically a mowing implement coupled to a lifting device in an alternative manner to that shown in FIGURE 3, FIGURE 10 is a plan view of a tractor having a mowing implement coupled thereto, FIGURE 11 is a front elevation, to an enlarged scale, of part of the mowing implement and coupling means shown in FIGURE 10, FIGURE 12 is a plan view of a tractor having three cultivating implements coupled thereto, FIGURE 13 shows a modification of the arrangements illustrated in FIGURES 5 and 7, FIGURE 14 is a section taken on the line XIV—XIV of FIGURE 13, and FIGURE 15 is a view, partly in section and to an enlarged scale, showing details of part of the driving mechanism for the mowing implements of FIGURES 13 and 14.

Referring to the drawings, FIGURES 1 and 2 show a tractor 1 to which is coupled a mowing implement 2 and a raking implement 3. The mowing implement 2 is of the kind having relatively reciprocable cutter blades but could, of course, be of any other known kind such, for example, as the kind in which one or more rotatable cutters are used. The tractor 1 is supported by two unsteerable wheels 4 and 5 spaced apart transversely of the tractor body with their axes of rotation coincident. The tractor 1 is also supported by a steerable wheel 6 which is spaced from the axes of rotation of the wheels 4 and 5 in a direction parallel to the length of the tractor and which, viewed in a direction parallel to the length of the tractor, is located substantially midway between the wheels 4 and 5. The tractor 1 is provided with an engine (not shown) which is housed beneath a bonnet 7 and which is arranged to transmit drive to the wheels 4 and 5 to move the tractor over the ground. The tractor also includes a driver's seat 8 which is mounted so as to be rotatable about a substantially vertical axis through an angle of at least 180°, means being provided whereby the seat can be retained in any one of at least two different angular settings about said substantially vertical axis.

The tractor 1 has a mounting bar or tow bar 10 at the end thereof adjacent to the steerable wheel 6 and a lifting device generally indicated by the reference numeral 9 at the end thereof adjacent to the unsteerable wheels 4 and 5.

The disposition of the various parts of the tractor 1 is such that, considered in the direction indicated by the arrow W in FIGURE 1, the following parts of the tractor appear in the following order, firstly, the lifting device 9, secondly, the driver's seat 8, thirdly, the engine and, fourthly, the mounting or towing bar 10.

The engine and transmission of the tractor 1 are preferably such that the tractor can proceed either in the direction W or in the opposite direction V with sufficient speed and tractive effort to propel and, if necessary, also drive one or more agricultural implements.

The lifting device 9 is a hydraulically operated three-point lifting device and includes two co-planar lower lifting arms 11 and 12 and a third lifting arm 13 disposed at a level above the arms 11 and 12. As can be seen in FIGURES 1 to 3, the mowing implement 2 is coupled to the lifting device 9 by means of a coupling member 14 which comprises a horizontal beam having pins 15 and 16 at its opposite ends which pins pivotally engage in holes in the free ends of the arms 11 and 12. Two upwardly inclined beams 17 and 18 are secured to the aforementioned horizontal beam and carry a vertically disposed fork at their uppermost ends between the limbs of which fork a horizontally disposed pin is mounted to pivotally receive the free end of the upper lifting arm 13. A semi-cylindrical baffle plate 19 is arranged between the coupling member 14 and the mowing implement 2 beneath which baffle plate is disposed a transmission shaft (not shown) for the mowing bar of the implement 2. The cylindrical surface of the baffle plate 19 tapers conically towards the mowing implement 2 (see FIGURE 1). The aforementioned driving shaft is coupled with the power take-off shaft 20 of the tractor 1 by means of a universal joint 20A. Swath boards 21 and 22 are provided at opposite ends of the mowing bar of the implement 2.

The raking implement 3 is coupled with the mounting or towing bar 10 of the tractor 1 by means of a longer coupling rod 23 and a shorter coupling rod 24, means generally indicated by the reference numeral 23A being provided whereby the longer coupling rod 23 can be connected with a main frame beam 29 of the implement 3 in several different ways so that the inclination of the latter to the direction of travel of the tractor 1 and thus the width of the strip of land worked by the implement 3 can be varied. The implement 3 includes four rake wheels 25, each of which is rotatably mounted at one end of a corresponding crank 26 whose opposite end is turnably mounted in a horizontal bearing carried by a corresponding support member 27. Each support member 27 is itself turnable about a corresponding vertical pivot pin 28 carried by a boss rigid with the main frame beam 29. The angular setting of each support member 27 relative to the main frame beam 29 can thus be fixed in any one of a number of different positions by known means (not shown).

The tractor and implement combination shown in FIGURES 1 and 2 is adapted, during the mowing of a crop, to move in the direction V, the driver's seat 8 being preferably disposed in the position shown in the drawings so that the driver faces in the direction in which the combination is mowing. The mowing implement 2 is brought into contact with the ground by appropriate adjustment of the lifting device 9 and is driven from the power take-off shaft 20 of the tractor. When the combination is moving in the direction V, the mowing implement 2 lies centrally in front of the tractor 1, its mowing bar being of a width greater than the distance between the unsteerable wheels 4 and 5 so that all the wheels 4, 5 and 6 ride over a strip of land from which the crop has already been mown. However, the swath boards 21 and 22 disposed behind the mowing bar of the implement 2 displace the greater part of the mown crop in such a way that the unsteerable wheels 4 and 5 pass on either side of it. The shape and disposition of the baffle plate 19 are such that mown crop which it engages is displaced laterally to one side or the other through a small distance so that it does not foul the transmission shaft nor power take-off shaft 20 and does not fall to the ground in the path of the steerable wheel 6 which latter, as can be seen in FIGURE 1, lies in line with the baffle plate 19 when the combination is moving in a straight line.

It will be apparent that, when the combination is moving in a straight line, the mown crop is deposited in two relatively narrow swaths one of which, considered in the direction V, lies between the unsteerable wheel 4 and the steerable wheel 6 and the other of which lies between the steerable wheel 6 and the unsteerable wheel 5, little or no mown crop being actually run over by any of the three wheels. The raking implement 3 is arranged to operate as a tedder and laterally displaces the two swaths just mentioned so that the mown crop is left well dispersed on the ground in a manner conducive to the drying thereof. Since the tedding operation is carried out concurrently with the mowing operation, an area of crop can be worked very rapidly.

By turning each of the support members 27 about their pivot pins 28 so that they extend substantially parallel to the length of the main beam 29, the implement 3 can be arranged to act as a side delivery rake when the combination is propelled in the direction W. It is thus possible to mow, and if desired, also ted, a crop during travel of the combination in one direction and to displace all the crop laterally to one side of the combination during travel in the opposite direction. It will be clear that during all the operations just mentioned the wheels 4, 5 and 6 of the tractor 1 ride over ground which is substantially free of mown crop.

FIGURE 3 shows diagrammatically the connection of the mowing implement 2 to the lifting device 9 by means of the coupling member 14. As can be seen in the figure, the locations at which the arms 11 to 13 are secured to the coupling member 14 are preferably such that the longitudinal axis of the arm 13 intersects the plane containing the two arms 11 and 12 at a point in front of the main implement 2 considered in the direction V of FIGURE 1. It can be seen that the lower arms 11 and 12 extend substantially horizontally when the mowing implement 2 bears on the ground while at the same time the upper arm 13 is inclined downwardly and forwardly of the tractor 1. During operation, the mowing bar of the implement 2 can follow undulations in the surface of the ground by pivotal movement of the arms 11 to 13 relative to the body of the tractor 1. The arrangement is such that, in most cases, the cutter blades of the mowing implement will not tend to cut into the ground while following undulations in the surface thereof and such that the operative cutting edge of the implement 2 is remote from the lifting device 9.

FIGURES 4 to 6 show the combination of a tractor 1 similar to that previously described with three mowing implements all connected to the end of the tractor 1 adjacent to the unsteerable wheels 4 and 5. In this case, the three mowing implements 31, 32 and 33 are all secured to the same coupling member 34 which latter comprises a horizontal beam 35 having a pin 36 at each of its opposite ends for connection with the free ends of the lower lifting arms 11 and 12 and also comprises two upwardly inclined beams 37 and 38 whose opposite ends are vertically disposed. The upper vertical ends of the beams 37 and 38 afford a fork between the limbs of which a horizontal pin 39 is mounted, the pin 39 receiving the free end of the upper lifting arm 13 of the lifting device 9.

The mowing implement 31 is generally similar in construction to the mowing implement 2 previously described and is arranged in a similar manner relative to the tractor 1. The implement 31 is provided with a tapering semicylindrical baffle plate 40 corresponding to the plate 19 in FIGURES 1 and 2, and with swath boards 41 and 42 corresponding to the swath boards 21 and 22 in FIGURE 1. The baffle plate 40 is secured to the coupling member 34 by means of two bars 43 and 44 so that, by way of the bars 43 and 44 and the plate 40, the mowing implement 31 is rigidly connected with the coupling member 34. Drive is transmitted to the mowing bar of the implement 31 by way of a transmission shaft (not shown) located beneath the plate 40, an intermediate shaft 45 and the power take-off shaft 20 of the tractor 1. The intermediate shaft 45 is journalled in horizontal bearings fastened to the coupling member 34 and is connected to the power take-off shaft and to the aforementioned transmission shaft by means of universal joints 20B and 45A.

Two flat links 46 and 47 are rigidly secured to the lowermost vertical ends of the beams 37 and 38 respectively of the coupling member 34. Further links 48 and 49 are pivoted to the links 46 and 47 by means of horizontal pins 50 and 51 respectively, the axes of the pivot pins 50 and 51 extending parallel to the length of the tractor 1. The links 46 and 47 carry lugs 52 and 53 respectively whereby pivotal movement of the links 48 and 49 relative to the links 46 and 47 is restricted in at least one direction. The mowing bar 32 is pivotally connected to the lowermost end of the link 48 and the mowing bar 33 is pivotally connected to the lowermost end of the mowing bar 49 but, since these connections are substantially identical, only the former will be described in detail.

The mowing implement 32 has a mowing bar constituted by a fixed cutter blade 54 carrying two upwardly extending spaced plates 55 and 56 (see FIGURE 6) between which latter a movable cutter blade 57 is adapted to reciprocate. A horizontal shaft 58 is rigidly secured to the lowermost end of the link 48 and extends in a direction parallel to the length of the tractor 1. The opposite ends of the shaft 58 are received in holes in the two plates 55 and 56 in such a way that the whole of the mowing implement 32 can turn about the axis afforded by the shaft 58. The free end of the shaft 58 is preferably provided with means (not shown) to prevent the plates 55 and 56 sliding axially of the shaft 58 and becoming detached therefrom.

The movable cutter blade 57 of the implement 32 and the corresponding movable cutter blade 65 of the implement 33 are driven, during operation, from the aforementioned intermediate shaft 45. To this end, the intermediate shaft 45 is provided with two eccentrically mounted circular discs 59 and 60 which are surrounded by rings 61 and 62 respectively. The rings 61 and 62 are free to rotate around the discs 59 and 60 and have coupling rods 63 and 64 rigidly secured thereto. The opposite end of the coupling rod 63 is pivotally connected to the movable cutter blade 57 and the opposite end of the coupling rod 64 is similarly connected to the cutter blade 65.

One end of a draw rod 66 is pivotally connected to the plate 55 of the mowing implement 32 and its opposite end is pivoted to one arm 67 of a lever 68 whose fulcrum is afforded by the lowermost end of a support 69 rigidly secured to the coupling member 34. The other arm 70 of the lever 68 is substantially at right angles to the first arm 67 and has its free end pivotally connected to a rod 71 which passes through a hole in a stop in the form of an arm 72 rigid with the body of the tractor 1. The hole in the arm 72 is of substantially greater diameter than that of the rod 71 so that the latter can move freely in the said hole. A stop in the form of a ring 73 is disposed around the rod 71 on that portion thereof which lies between the arm 70 and the arm 72, the ring being slidable along the rod 71. Means is preferably provided whereby the ring 73 can be fixed at any one of a number of different positions along the rod 71 from the point at which the rod is pivoted to the arm 70 of the lever 68.

A tension spring 74A extends between a location on the plate 55 close to the connection of the draw rod 66 and an anchorage 74B midway along the link 48. The spring 74A acts to relieve at least a part of the pressure with which the mowing bar of the implement 32 bears upon the ground. The mowing implement 33 is similarly provided with a draw rod 66A, a lever 68A, a rod 71A and a tension spring 74C. Two staples 74 and 75 are respectively mounted on the upper sides of the stationary cutter blades of the mowing implements 32 and 33. Furthermore, the implement 32 is provided with a stop 32A mounted adjacent to the plate 55 and the implement 33 is similarly provided with a stop 33A. The laterally outermost end of the implement 33 has a swath board 78 secured thereto and the implement 33 is similarly provided with a swath board 79.

The combination is adapted to be moved in the direction indicated by the arrow P in FIGURE 4, the three mowing implements 31 to 33 being pushed in front of the tractor. The crop mown by the implement 31 is formed into two swaths in the manner previously described in connection with FIGURES 1 and 2, the cutter blades also being operated in a similar manner by means of the driving shaft disposed beneath the baffle plate 40. The mowing implements 32 and 33, on the other hand, are operated by the drive derived from the intermediate shaft 45 by way of the coupling rods 63 and 64. It can be seen in FIGURE 5 that the centers of the two eccentric discs 59 and 60 are 180° removed from one another around the auxiliary shaft 45 so that the movable cutter blades 57 and 65 will, at any given instant during operation, be moving in relatively opposite directions. The motions of the blades 57 and 65 both set up forces which tend to produce an undesired oscillatory motion of parts of the combination but, by means of the arrangement just described, the major parts of these two forces cancel each other out thus substantially reducing such undesired motion. However, in some cases, for the sake of simplicity it may be preferred to mount both the rings 61 or 62 or an equivalent single ring on one eccentric disc. Since the mowing implements 32 and 33 are pivotable about horizontal axes extending in the direction of travel relative to the movable links 48 and 49 and since the latter are themselves pivotable about further similar axes relative to the fixed links 46 and 47, the implements are capable of movements to match undulations in the surface of the ground over which the combination is passing.

When it is desired to move the combination without having the mowing implements in operation, for example, during passage of the combination from one field to another or along public roads, the three implements can be lifted out of contact with the ground by means of the lifting device 9. In most cases, it will also be desirable to reduce the overall width of the combination to as small a dimension as possible. This is achieved by turning the implement 32 upwardly about the shaft 58 and the implement 33 upwardly about the corresponding shaft 58a by means of the parts 66, 66A, 68, 68A, 71, 71A previously described. During a lifting operation of the device 9, the support 69 also moves upwardly, this tending to move the rod 71 and lever 68 similarly. However, this is prevented by means of the ring 73 since the latter comes into contact with the underside of the arm 72 which is rigid with the body of the tractor 1. Since the lever 68 cannot rise with the support 69, it is compelled to turn about the lower end of the support 69 in the direction indicated by the arrow F in FIGURE 5. The draw-rod 66 pivoted to the arm 67 of the lever is thus moved inwardly towards the longitudinal axis of the tractor 1. This movement causes the plates 55 and 56 to turn about the shaft 58 and the cutter blade to turn about its pivotal connection with the coupling rod 63, whereby the blades 57 and 65 will slide relative to the fixed blades 54. By suitable adjustment of the position of the ring 73 axially of the rod 71, the implements 32 and 33 can be arranged to turn upwardly through an angle of about 90° around the shafts 58 and 58A. The stops 32A and 33A prevent excessive upward pivotal movement about the shafts 58 and 58A.

When the two implements 32 and 33 occupy the withdrawn positions just described, the two tension springs 74A and 74C tend to turn the implements 32 and 33 back around the shafts 58 and 58A into the positions shown in the drawings. That is to say, the spring 74A tends to turn the implement 32 about the shaft 58 in the direction indicated by the arrow S in FIGURE 5. However, a turning movement in the direction S is prevented when the implement 32 is in its withdrawn position by means of the system of rods and levers 66, 68 and 71 previously described. During lowering of the lifting device 9, on the other hand, the rod and lever system ceases to restrain the spring 74A as soon as the ring 73 comes out of contact with the arm 72 so that the said spring immediately acts to move the implement 32 in the direction S. The center of gravity of the implement 32 is thus moved laterally further away from the longitudinal axis of the tractor 1 by the spring 74A and also, to a progressively increasing extent, by the action of gravity until the anchorage 48, the shaft 58 and the location of the connection of the spring 74A to the plate 55 all lie in the same plane. By this time, the center of gravity of the implement 32 is spaced from the shaft 58 by a distance which is such that the implement continues to move downwardly in the direction S into the position shown in FIGURE 5 despite the fact that during the last part of its turning movement it is opposed by the spring 74A. The weight of the implement 32 and the tension of the spring 74A are, of course, so matched that during the last part of the movement just mentioned, the spring 74A is re-tensioned.

In cases in which it is desired to use only the mowing implement 31 or, alternatively, the mowing implement 31 in combination with either one or the other of the two implements 32 and 33 alone, it is necessary to maintain one or both the implements 32 and 33 out of operation. This is accomplished by turning both implements 32 and 33 upwardly about the shafts 58 and 58A into the withdrawn positions previously described, whereupon means such as a chain can be fastened between the staple 74 and a similar staple 76 mounted on the beam 38, or between the staple 75 and a similar staple 77 mounted on the beam 37, or both, as desired. Upon relowering the lifting device 9, the chained implement, or both implements, will remain out of operation in the withdrawn position.

Since, considered in the direction P, both the mowing implements and the driver's seat 8 are located forwardly of the engine of the tractor 1, the driver of the tractor has a substantially unimpaired view of the implements which is, of course, conducive to the efficient operation of the combination.

FIGURES 7 and 8 show an alternative embodiment of means whereby the mowing implements 32 and 33 can be caused to turn upwardly into withdrawn positions during raising of the lifting device 9. The majority of the parts shown in FIGURES 7 and 8 correspond to those shown in FIGURES 4 to 6 and are therefore designated by the same reference numerals. However, in this case, the plate 56 projecting upwardly from the stationary cutter blade 54 is coupled to one end of a chain 82 through the intermediary of a tension spring 82A, the point of connection of the spring 82A to the plate 56 being spaced from the shaft 58. The chain 82 passes around a pulley 80 rotatably mounted on the coupling member 34 and acting as a guide, the end of the chain remote from the spring 82A being secured to the lower end of a support 81 which is rigidly mounted on the body of the tractor 1. The chain 82 is thus disposed in two mutually inclined lengths. Instead of employing the shaft 58, a sleeve 58C may be rigidly mounted at the lower end of the link 47, a pin 58B passing through holes in the plates 55 and 56 and through the bore in the sleeve 58C.

During lifting of the device 9, the distance between the pulley 80 and the lower end of the support 81 increases so that the length of the chain which extends between these points must also increase. The total length of the chain 82 is, of course, fixed so that the portion extending between the pulley 80 and the plate 56 must become shorter. Consequently the point of connection of the spring 82A to the plate 56 moves towards the pulley 80 thereby causing the implement 32 to pivot upwardly about the shaft 58 or pin 58B in the direction indicated by the arrow T in FIGURE 7. A stop in the form of a plate 55A secured to the plate 55 limits this pivotal movement by coming into abutting engagement with the side of the link 47. Breakage of any of the parts is prevented due to further raising of the lifting device 9 after the stop 55A has met the link 47 by the provision of the spring 82A which can elongate to accommodate any such movement. Springs similar to the spring 82A may be employed in the arrangement described with reference to FIGURES 4 to 6 to connect the lower ends of the rods 66 and 66A with the plate 55. A chain or chains may again be used to maintain either or both of the implements 32 and 33 in their withdrawn positions by means of the staples 74 to 77 as previously described. Alternatively, either or both the implements 32 and 33 may be retained in the withdrawn position by means of hooks 82B mounted on the horizontal beam 35 of the coupling member 34, the hooks 82B being engaged with the chain 82 in the withdrawn position so that the implements 32 and 33 cannot move back into the position shown in the drawings. If desired, tension springs 74A and 74C may be employed in the arrangement shown in FIGURES 7 and 8 to serve the same purpose as previously described.

FIGURE 9 shows diagrammatically how a mowing implement 91 can be coupled with a lifting device 9 whose arms 85 and 86 are not capable of yielding in vertical directions during movement over the ground in such a way that the implement 91 can itself move vertically to follow undulations in the surface of the ground. A coupling member 87 of substantially the same construction as the coupling member 34 shown in FIGURES 4 and 5 is secured to the lifting arms 85 and 86 and is provided with further arms 88 and 89 located at different heights above the ground. The arms 88 and 89 are pivoted to a further coupling member 90 to which the mowing implement 91 is secured. As previously, the arrangement is such that the longitudinal axis of the arm 89 intersects the plane containing the arms 88 at a location in front of the implement 91 considered in the intended direction of travel Q. In this case, however, the points of connection of the arms 88 to the further coupling member 90 are located in front (considered in the direction Q) of the point of connection of the further coupling member 90 with the arm 89. A tension spring 92 is stretched between the apex of the coupling member 87 and a member interconnecting the leading ends of the arms 88 so that the lifting device 9 resiliently supports at least part of the weight of the implement 91.

A chain 92A interconnects the same points as the spring 92 and thus prevents the implement 91 from moving downwardly relative to the lifting device 9 beyond a predetermined limit.

FIGURES 10 and 11 show another method of mounting a mowing implement 96 in such a way that it shall be movable vertically relative to the lifting device 9 of a tractor 1 when the said lifting device is not itself capable of movements in vertical directions during travel over the ground. The fixed cutter blade 95 of the implement 96 is provided with a shorter support 97 and a longer support 98, the shorter support 97 being pivoted to a link 99 which is, in turn, pivoted to one end of a crank 100. The longer support 98 is directly pivoted to one end of a similar crank 101. The lengths of the support 97 and the link 99 are such that the maximum distance between the fixed cutter blade and the pivot between the link 99 and the crank 100 is equal to the distance between said cutter blade and the pivot between the longer support 98 and the crank 101.

The end of the crank 101 remote from the support 98 is pivoted to a beam 102 and the crank 100 is similarly pivoted to a beam 103, the beams 102 and 103 together forming part of a coupling member for connecting the implement 96 to the lifting device 9 of the tractor 1. The adjacent end sections of the beams 102 and 103 are upwardly inclined in opposite directions and their two upper ends are interconnected by means of a member 104. Aligned holes are formed in the upper ends of the beams 102 and 103 in the region of the member 104 to enable the beams to be connected with the upper lifting arm of the device 9. Plates 105 and 106 are secured to horizontally extending portions of the beams 102 and 103 respectively, the plates being adapted for connection by means of pins to the lower lifting arms of the device 9.

A baffle plate 107 similar to the plates 19 and 40 previously described is secured to the upper surface of the fixed cutter blade 95A and a transmission shaft (not shown) extends beneath the baffle plate 107 between the cutter blade 95 and the power take-off shaft 20 of the tractor 1, suitable universal joints being provided in the transmission. A lug 108 is also mounted on the upper surface of the fixed cutter blade 95A and is coupled by way of a tension spring 109 with a screw-threaded rod 110 which passes through a boss 113 mounted on the beam 103. The tension in the spring 109 can be adjusted by rotation of a wing-nut 111 in an appropriate direction, the selected setting being fixed by means of a further locking wing nut 112. It will be clear that, during operation, the implement 96 can yield vertically relative to the lifting device 9, the tension spring 109 acting to relieve at least a part of the pressure with which the implement 96 bears upon the surface of the ground. Furthermore, the spring 109 prevents both the cranks 100 and 101 from turning downwardly into a vertical position when the lifting device 9 is operated. Without the provision of the spring 109, the lifting device 9 would have to move vertically though a considerable distance to lift the implement 96 clear of the ground. With the arrangement described, it is preferable that the lug 108 should be mounted at approximately the center of gravity of the implement 96 in order to prevent the latter from adopting an inclined position relative to the ground surface during operation of the lifting device 9. As an alternative, two or more springs similar to the spring 109 may be used to interconnect the implement 96 with the beams 102 and 103.

It will be clear that agricultural implements other than mowing implements may be employed in combination with a tractor in a manner similar to that described above. For example, FIGURE 12 shows a combination of a tractor 1 with three cultivating implements 115, 116 and 117. The tractor 1 is itself identical to that previously described and its parts are therefore designated by the same reference numerals as have been previously used. The driver's seat 8, however, faces in the opposite direction to that shown in any of the preceding figures so that the driver shall face in the intended direction of travel Z of the combination.

A coupling member 114 similar to those previously described is connected to the lifting device 9 of the tractor 1 and the cultivating implements 115 to 117 are connected to the coupling member 114 in a manner which is generally similar to that shown in FIGURES 4 to 6 in connection with the mowing implements 31 to 33. The implement 115 is located centrally behind the tractor 1 and is journalled in horizontal bearings carried by arms 118 and 119 rigid with the coupling member 114. Flat laterally extending links 120 and 121 are rigidly secured to the coupling member 114 and further movable links 122 and 123 are respectively pivoted to the links 120 and 121 so as to be turnable about horizontal axes extending substantially parallel to the direction Z. Fork-shaped brackets 124 and 125 are mounted at the laterally outermost ends of the two links 122 and 123 respectively, the bracket 124 carrying a horizontal rotatable shaft 126 and the bracket 125 carrying a similar shaft 127, the longitudinal axes of the shafts 126 and 127 also extending substantially parallel to the direction Z. The shaft 126 is also engaged by the limbs of a forked-bracket 128 whose width is somewhat greater than that of the bracket 124 so that the limbs of the latter both lie between the limbs of the bracket 128. The bracket 128 is pivotable relative to the bracket 124 about the axis afforded by the shaft 126. A forked-bracket 129 similar to the bracket 128 is arranged in the manner just described relative to the bracket 125. The base of the forked bracket 128 has a bearing in which one end of the shaft 131 of the implement 116 is journalled and the base of the bracket 129 has a similar bearing in which one end of the shaft 132 of the implement 177 is journalled. Both the shafts 131 and 132 and also the shaft 139 of the implement 115 carry tine-shaped or disc-shaped members 130 adapted to work the ground over which the implements are passing upon rotation of the said three shafts.

The shafts 131, 132 and 139 are driven from the power take-off shaft of the tractor 1. An intermediate shaft 133 is connected to the power take-off shaft of the tractor by meas of a universal joint or the like (not shown) and is journalled in one or more bearings supported by the coupling member 114. The end of the intermediate shaft 133 remote from the power take-off shaft of the tractor 1 is connected to a further intermediate shaft 135 by way of the universal joint 134 and, in turn, to a shaft 137 by way of a still further universal joint 136. The end of the shaft 137 remote from the said universal joint 136 carries a bevel gear 138 whose teeth mesh with those of a bevel gear 140 mounted approximately midway along the length of the shaft 139. The intermediate shaft 133 carries two pulleys or sprocket wheels 141 and 142 which are connected by ropes or chains to pulleys or sprocket wheels 143 and 144 carried by the shafts 126 and 127 respectively. The shaft 126 is provided with a bevel gear 145 whose teeth engage those of a bevel gear 147 provided at the extreme innermost end of the shaft 131. Bevel gears 146 and 148 interconnect the shafts 127 and 132 in a similar manner. The gearing is so arranged that, during operation of the combination, all the shafts 131, 132 and 139 rotate in the same direction.

Arrangements of the kind previously described in connection with FIGURES 4 to 6 and FIGURES 7 and 8 of the drawings may be used to swing the cultivating implement 116 or the cultivating implement 117 or both upwardly into a withdrawn position, the axes of the shafts 126 and 127 affording the necessary pivots. When one or both of the implements 116 and 117 is in its withdrawn position, it is advantageous to be able to disconnect the drive thereto. To this end, the bevel gears 147 and 148 may be splined to the shafts 131 and 132 and slidable axially thereof to positions in which their teeth no longer engage the teeth of the bevel gears 145 and 146. It will be clear that during travel of the combination shown in FIGURE 12 in the direction Z, the wheels 4, 5 and 6 of the tractor 1 do not run over ground which has been worked by the implements 115, 116 and 117.

FIGURES 13 and 14 show a further alternative means of connecting a plurality of mowing implements with the lifting device of a tractor 150. The mowing implements, the driving mechanisms therefor and the means for moving one or more of the mowing implements into a withdrawn position are similar to those shown in FIGURES 4 to 8 of the drawings and the corresponding parts thereof are accordingly designated by the same reference numerals. The mowing implements 32 and 33 are pivotally connected by means of the shafts 58 and 58B to the opposite ends of a frame beam 151 which comprises a central horizontal portion 152 and two integral inclined portions 153 and 154. An inverted U-shaped bracket 155 has its opposite ends secured to the opposite ends of the portion 152, the bracket 155 carrying co-axial horizontal pins 156 and 157 adapted to receive the ends of the lower lifting arms of the lifting device of the tractor 150. A pair of parallel lugs 158 project upwardly at the uppermost point of the bracket 155 and support a horizontal pin adapted to receive the end of the upper lifting arm of the lifting device of the tractor 150. Bars 43 and 44 are also rigid with the bracket 155 and act to connect the mowing implement 31 thereto. The bracket 155 also carries staples 159 corresponding to the staples 76 and 77 previously described. The intermediate shaft 45 is journalled in a bearing 160 secured to the underside of the portion 152 of the frame beam 151. In this construction the majority of the parts which transmit drive to the mowing implements 31 to 33 are located close to ground level.

FIGURE 15 shows details of an arrangement whereby the drive to the implement 32 or the drive to the implement 33 or both can be readily disconnected when either or both these implements are in their withdrawn positions. The same mechanism can, of course, also be employed in connection with the arrangement shown in FIGURES 4 to 8. The eccentric discs 59 and 60 are freely rotatable around the intermediate shaft 45 and are provided with toothed recesses 161 and 161A respectively, the teeth being adapted to co-operate with mating teeth formed on the surfaces of sleeves 162 and 162A which are slidable axially of the auxiliary shaft 45 and are constrained to rotate therewith by means of keys 168 and 168A. The outer surfaces of the sleeves 162 and 162A are formed with grooves 163 and 163A in which pins 164 are received (only one pin 164 being visible in the FIGURE). The pins 164 are carried by levers 165 and 165A respectively, the said levers being turnably mounted by means of pivot pins 166 and 166A upon a bracket 167 rigid with the frame beam 151. Each of the levers 165 and 165A is formed with a hole which can be brought into alignment with either one of two holes 170 and locked in that position by means of a pin 169, the two holes 170 corresponding to positions of the pins 164 in which the sleeve 162A is either in driving engagement with, or is free of, the disc 59 or in which the sleeve 162 is in driving engagement with, or is free of, the disc 60. It will be seen from FIGURE 15 that the disc 59 and sleeve 162A and also the disc 60 and sleeve 162 can only come into driving engagement in one relative position. This is in order to ensure that, when both the implements 32 and 33 are in use, the previously mentioned advantageous relative disposition of the discs 59 and 60 whereby undesired oscillation of the combination is reduced is maintained.

The auxiliary shaft 45 is prevented from moving axially of the bearing 160 by the provision on one side of the bearing of a ring 171 rigid with the auxiliary shaft 45 and on the other of a further ring 172 which is secured to the auxiliary shaft 45 by means of a transverse pin or the like 173.

It will be clear that drive can be readily engaged or discontinued to either of the implements 32 or 33 merely by bringing the levers 165 and 165A to appropriate settings and by positioning the locking pins 169 so as to maintain these settings.

What I claim is:

1. A tractor in combination with a pair of agricultural implements, one of said implements centrally connected to an end of said tractor, and the other of said implements extending transversely to one side of said tractor, said second mentioned implement also connected to the same end of said tractor that said first mentioned implement is connected, a power take-off on said tractor located at the same end as said implements, transmission means connecting said power take-off and said first mentioned implement, further transmission means inter-connecting said first mentioned transmission means to said second mentioned implement, said power take-off and said transmission means being located approximately centrally of said tractor, a lifting device in said end of said tractor, and linkage means linking said second mentioned implement to said lifting device whereby when said lifting device is raised said second mentioned implement is pivoted upwardly to a substantially vertical position, a stop member on said tractor for limiting the movement of said second implement, said stop member being provided with a hole, a second stop, and a coupling rod, said lever being connected to said coupling rod which passes through said hole associated with said stop, said second stop being provided on said coupling rod whereby during the lifting operation of said lifting device the upward movement of said coupling rod is prevented as soon as said second stop comes into contact with said first stop, the latter being rigid relative to said tractor, a driver's seat on said tractor, said seat being located on the same end of said tractor as said lifting device relative to the engine of the tractor.

2. A tractor in combination with a pair of agricultural implements, said implements being connected with a coupling member attached to the front end of the tractor relative to the direction of travel, the first of said implements being disposed generally centrally of said tractor, the second of said implements being disposed to the rear of said first mentioned implement and extending substantially to one side of said tractor, transverse linkage means coupling said second implement with said coupling member, said linkage means being connected to the inner end of said second implement, a power take-off on said tractor, a driving shaft on said coupling member, a transmission shaft connecting said power take-off and said driving shaft, substantially longitudinally extending transmission means connecting said driving shaft and said first implement, further transmission means extending substantially laterally connecting said driving shaft to said second implement, said transmission means being at said front end of said tractor and being located generally adjacent one another.

3. The invention of claim 2 wherein the first implement is hingedly connected to said coupling member.

4. The invention of claim 2 wherein the tractor is provided with a pair of draft arms and the coupling member is secured to said arms.

5. The invention of claim 2 wherein the linkage means is hingedly coupled to said second implement, said linkage means being turnable about a substantially horizontal axis.

6. The invention of claim 5 wherein the tractor is provided with a pair of draft arms and the coupling member is secured to said arms whereby when said coupling member is raised by said arms, said second implement folds upwardly.

References Cited by the Examiner

UNITED STATES PATENTS

| | | | |
|---|---|---|---|
| 190,484 | 5/1877 | Fuller | 56—193 |
| 1,069,736 | 8/1913 | Shorman | 56—6 |
| 1,164,305 | 12/1915 | Nilson et al. | 56—6 |
| 1,279,060 | 9/1918 | Wilder | 56—6 |
| 1,672,461 | 6/1928 | Lehr | 56—25 |
| 1,726,535 | 9/1929 | Bowers | 56—193 |
| 1,750,033 | 3/1930 | White | 56—25 |
| 2,120,040 | 6/1938 | Phillips | 56—193 |
| 2,143,473 | 1/1939 | Brown | 56—25 |
| 2,150,350 | 3/1939 | Vargas | 56—6 |
| 2,256,185 | 9/1941 | Ariens | 172—120 |
| 2,352,291 | 6/1944 | Scarratt et al. | 56—14 |
| 2,468,313 | 4/1949 | Turner | 56—25 |
| 2,477,389 | 7/1949 | Oehler et al. | 56—23 |
| 2,540,228 | 2/1951 | Adkisson | 56—193 |
| 2,603,050 | 7/1952 | Scheer | 56—6 |
| 2,673,437 | 3/1954 | Pollock et al. | 56—25 |
| 2,687,606 | 8/1954 | Greer et al. | 56—25 |
| 2,750,726 | 6/1956 | Boucard et al. | 56—25 |
| 2,779,145 | 1/1957 | Smith | 56—25 |
| 2,957,529 | 10/1960 | Kaller | 172—120 |

FOREIGN PATENTS

| | | |
|---|---|---|
| 492,948 | 4/1954 | Italy. |

ABRAHAM G. STONE, *Primary Examiner.*

CARL W. ROBINSON, RUSSELL R. KINSEY, T. GRAHAM CRAVER, *Examiners.*